United States Patent [19]
Cornay

[11] Patent Number: 6,139,435
[45] Date of Patent: *Oct. 31, 2000

[54] UNIVERSAL JOINT HAVING CENTERING DEVICE

[76] Inventor: Paul Joseph Cornay, 1707 N. Main St., Suite 304, Longmont, Colo. 80501

[*] Notice: This patent is subject to a terminal disclaimer.

[21] Appl. No.: 09/173,614

[22] Filed: Oct. 16, 1998

Related U.S. Application Data

[63] Continuation of application No. 08/682,801, Jul. 10, 1996, Pat. No. 5,823,881.
[60] Provisional application No. 60/000,993, Jul. 10, 1995.

[51] Int. Cl.$^7$ ..................................... F16D 7/02
[52] U.S. Cl. ................................ 464/11; 464/118
[58] Field of Search ............................ 464/132, 128, 464/129; 384/568

[56] References Cited

U.S. PATENT DOCUMENTS

| | | |
|---|---|---|
| 730,604 | 6/1903 | Brazier . |
| 1,913,783 | 6/1933 | Williams . |
| 2,346,058 | 4/1944 | Waldron . |
| 2,737,791 | 3/1956 | Dillman et al. . |
| 2,780,079 | 2/1957 | Wahlberg . |
| 2,986,022 | 5/1961 | Stokely . |
| 3,064,453 | 11/1962 | Barsness et al. . |
| 4,257,243 | 3/1981 | Herchenbach . |
| 4,508,522 | 4/1985 | Numazawa et al. . |
| 4,557,613 | 12/1985 | Tallian et al. ........................ 384/568 |
| 4,579,546 | 4/1986 | Pastor . |
| 4,650,439 | 3/1987 | Mayhew . |
| 4,909,641 | 3/1990 | McKenzie . |
| 4,955,741 | 9/1990 | Komeyama . |
| 5,094,651 | 3/1992 | Cornay . |
| 5,098,342 | 3/1992 | Mizukoshi ........................... 464/132 |
| 5,213,546 | 5/1993 | Schneider ............................ 464/132 |
| 5,277,659 | 1/1994 | Cornay . |
| 5,425,676 | 6/1995 | Cornay . |
| 5,433,667 | 7/1995 | Schafer et al. . |
| 5,525,110 | 6/1996 | Riccitelle et al. . |
| 5,823,881 | 10/1998 | Cornay ................................ 464/118 |

FOREIGN PATENT DOCUMENTS

| 2058111 | 5/1972 | Germany ............................. 384/447 |

OTHER PUBLICATIONS

Society of Automotive Engineers Universal Joint and Driveshaft Design Manual (AE–7) (1979) pp. 103, 112–115, 123, 124, 323, and 331.

Primary Examiner—Lynne H. Browne
Assistant Examiner—Aaron Dunwoody
Attorney, Agent, or Firm—Garvey, Smith, Nehrbass & Doody, L.L.C.

[57] ABSTRACT

A universal joint (150) includes a centering device (160) for maintaining the joint at constant velocity. Each shaft (101) of the joint (150) is connected to a centering device (160). Movement of one of the shafts (101) at an angle relative to the longitudinal axis of the coupling device (117) is transmitted to the other shaft (101) by the centering device (160) and the centering device (160) causes the other shaft (101) to likewise move at the same angle relative to the longitudinal axis of the coupling device (117). The centering device (160) includes an epicyclic bearing (106) within an epicyclic bearing (105), which arrangement of epicyclic bearings allows a full range of movement of the shafts (101).

2 Claims, 13 Drawing Sheets

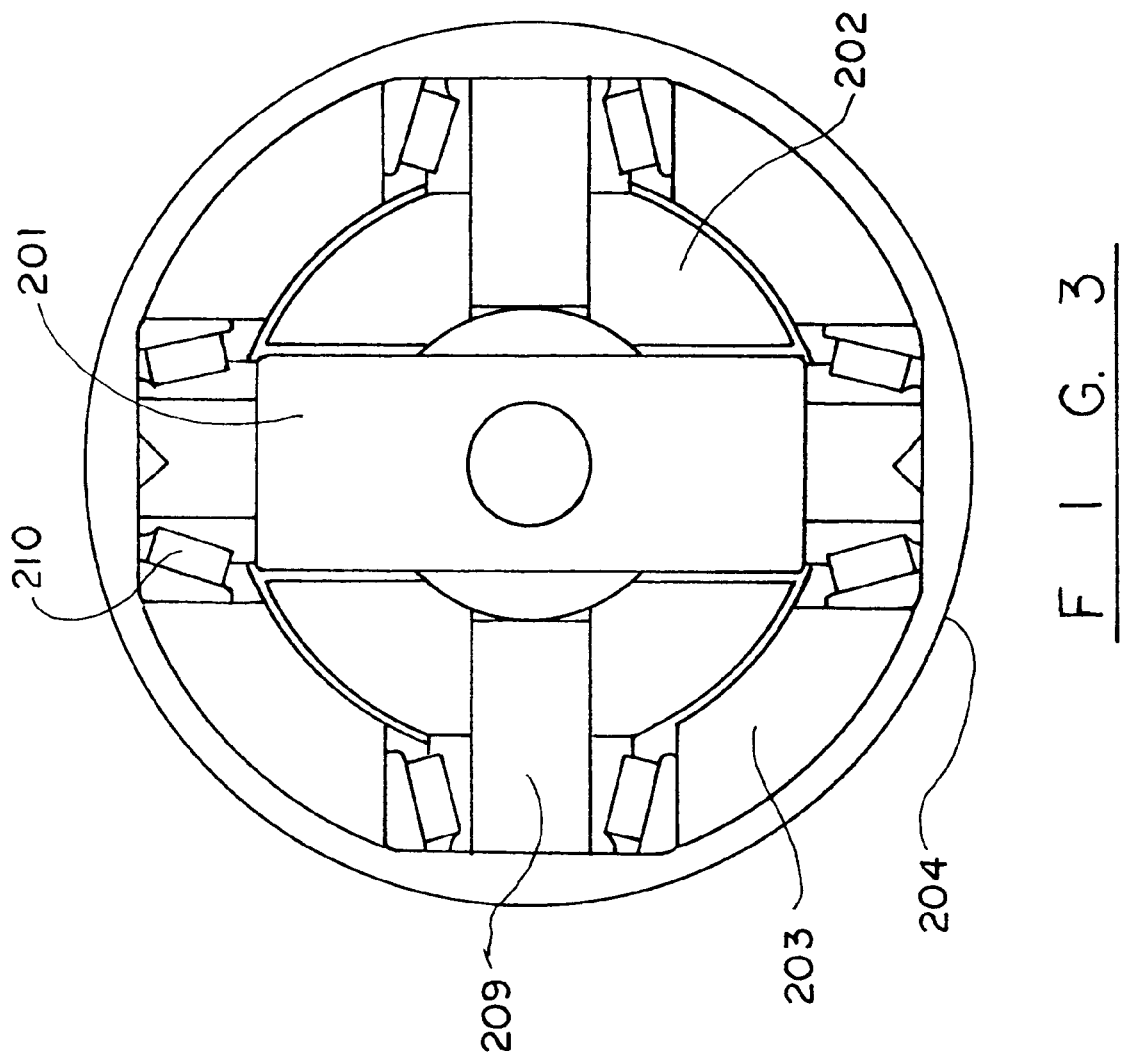
F I G. 3

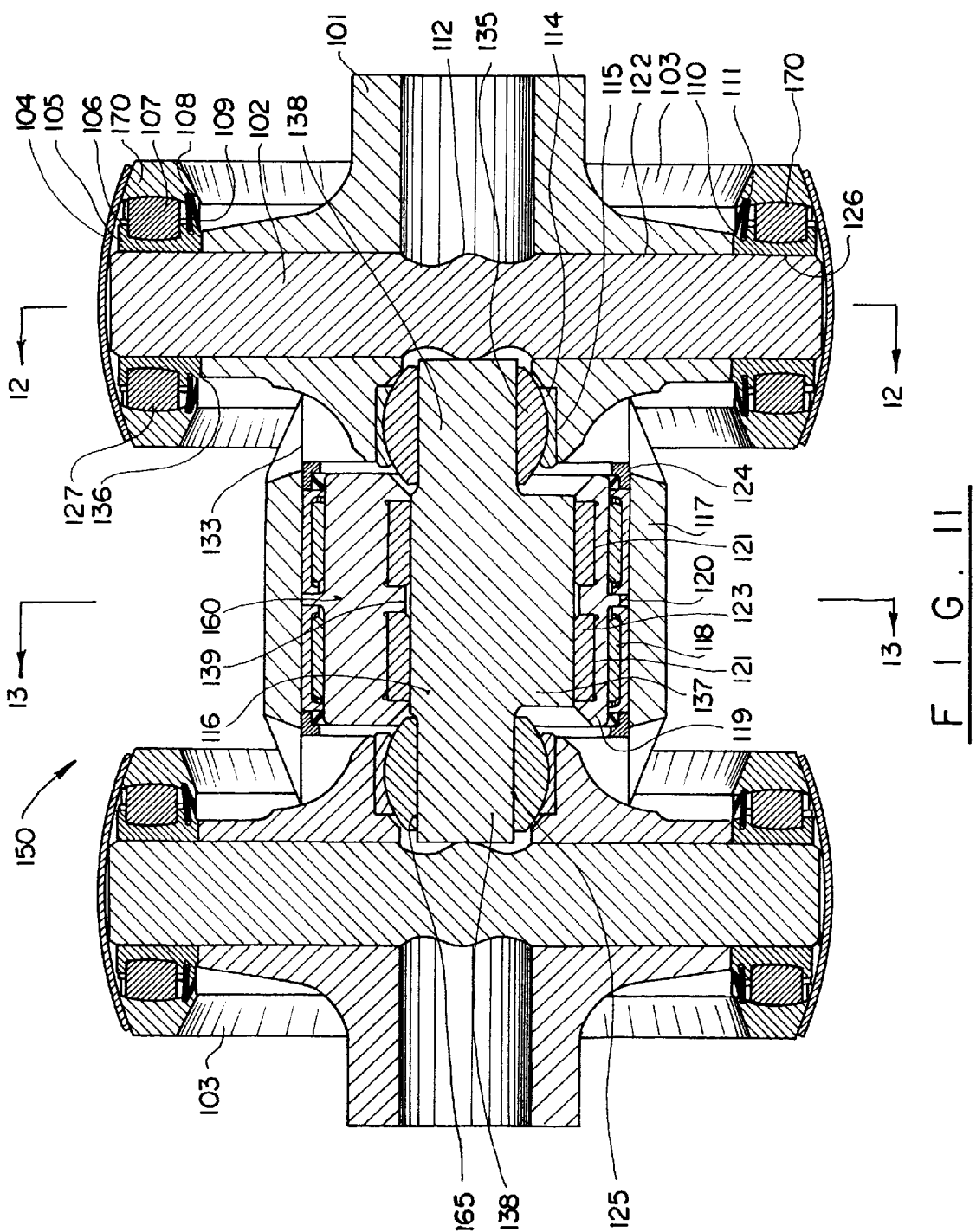

SECTION 12-12

SECTION 13-13

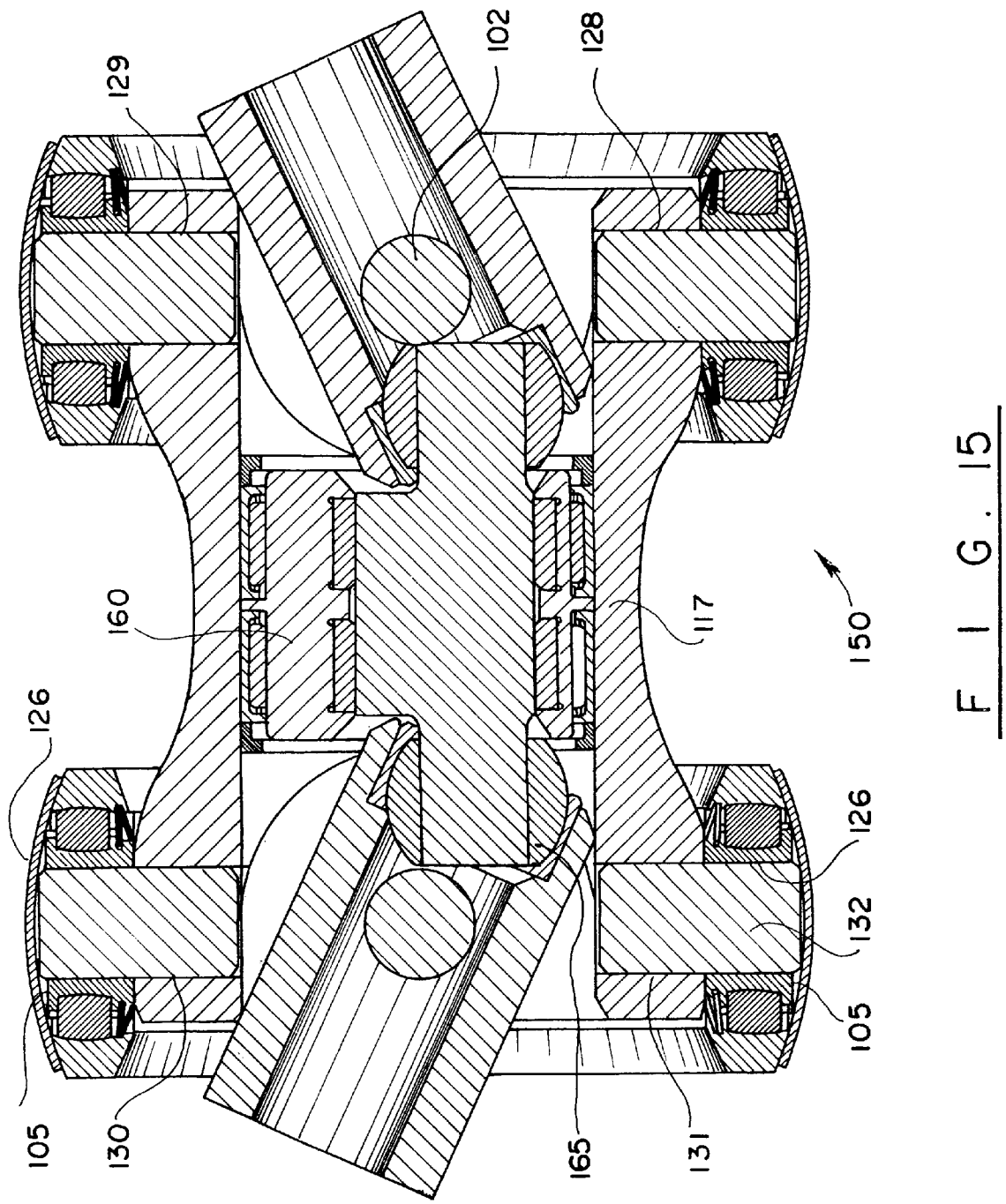
F I G. 15

6,139,435

UNIVERSAL JOINT HAVING CENTERING DEVICE

This application is a continuation of U.S. patent application Ser. No. 08/682,801, filed Jul. 10, 1996, now U.S. Pat. No. 5,823,881, which claims priority of U.S. Provisional Patent Application No. 60/000,993, filed on Jul. 10, 1995.

BACKGROUND OF THE INVENTION

1. Field of the Invention

The present invention relates to universal joints having centering devices.

Additional information about related universal joints can be found in U.S. Pat. Nos. 5,094,651; 5,277,659; and 5,425,676; and in International Application No. PCT/US94/06448, published on Dec. 22, 1994 as International Publication No. WO 94/29604.

2. General Background of the Invention

Universal joints are used in a multitude of industries, including the aerospace, automotive, and marine industries. The aerospace industry uses universal joints, for example, to transfer power to control surfaces. Universal joints are used in steering columns in automobiles to transfer power. Universal joints are used in boat motors. In addition, universal joints can be found in everything from tractors to robots.

Information about universal joints can be found, for example, in the Society of Automotive Engineers Universal Joint and Driveshaft Design Manual (AE-7) (1979), hereby incorporated by reference. General information about centering devices for universal joints can be found, for example, in this manual, especially at pages 103, 112–115, 123, 124, 323, and 324.

SUMMARY OF THE INVENTION

The present invention claimed herein comprises a double universal joint, which can be of the type described in U.S. Pat. No. 5,277,659, but with a centering device to maintain the angular velocity ratio of the input shaft and the output shaft as close to unity as possible.

The present invention also comprises the centering device itself.

The present invention is a universal joint which includes a centering device for maintaining the joint at constant velocity. Each shaft of the joint is connected to a centering device. Movement of one of the shafts at an angle relative to the longitudinal axis of the coupling device is transmitted to the other shaft by the centering device and the centering device causes the other shaft to likewise move at the same angle relative to the longitudinal axis of the coupling device. The centering device includes an epicyclic bearing within an epicyclic bearing, which arrangement of epicyclic bearings allows a full range of movement of the shafts.

The universal joint of the present invention is preferably a constant velocity universal joint.

Preferably, the centering means allows the joint to operate at constant velocity at all angles in a predetermined design range.

By use of an epicyclic bearing within an epicyclic bearing, it is possible to move the ball and socket center points of the centering device closer to the center of the joint than in prior art centering devices. In general, the closer to the center of the joint one can locate the balls and sockets connecting the main shafts to a centering device, the lower the forces on the centering device will be. In the present invention, the balls and sockets can be moved closer to the joint center without causing large oscillation motion of the centering devices as in some prior art centering devices. In some prior art centering devices, if one moved the balls and sockets closer to the joint center it would cause the provision of more lateral motion or oscillation of the centering device than with the present invention. The centering device of the present invention can employ stronger parts within a given coupling member than some prior art centering devices.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein:

FIG. 2A is an end view showing the centering device of the first embodiment of the present invention;

FIG. 3 is a cross-sectional view of the joint of the first embodiment of the present invention;

FIG. 11 is a side, cross-sectional view of a universal joint including a centering device of the preferred embodiment of the present invention;

FIG. 15 is a side, cross-sectional view, rotated 90 degrees from FIG. 14, of the universal joint of the preferred embodiment of the present invention, showing the joint at maximum operating angle (in this example, with the shafts misaligned with one another by 50 degrees) with the long pins parallel;

PARTS LIST

Figure 1:
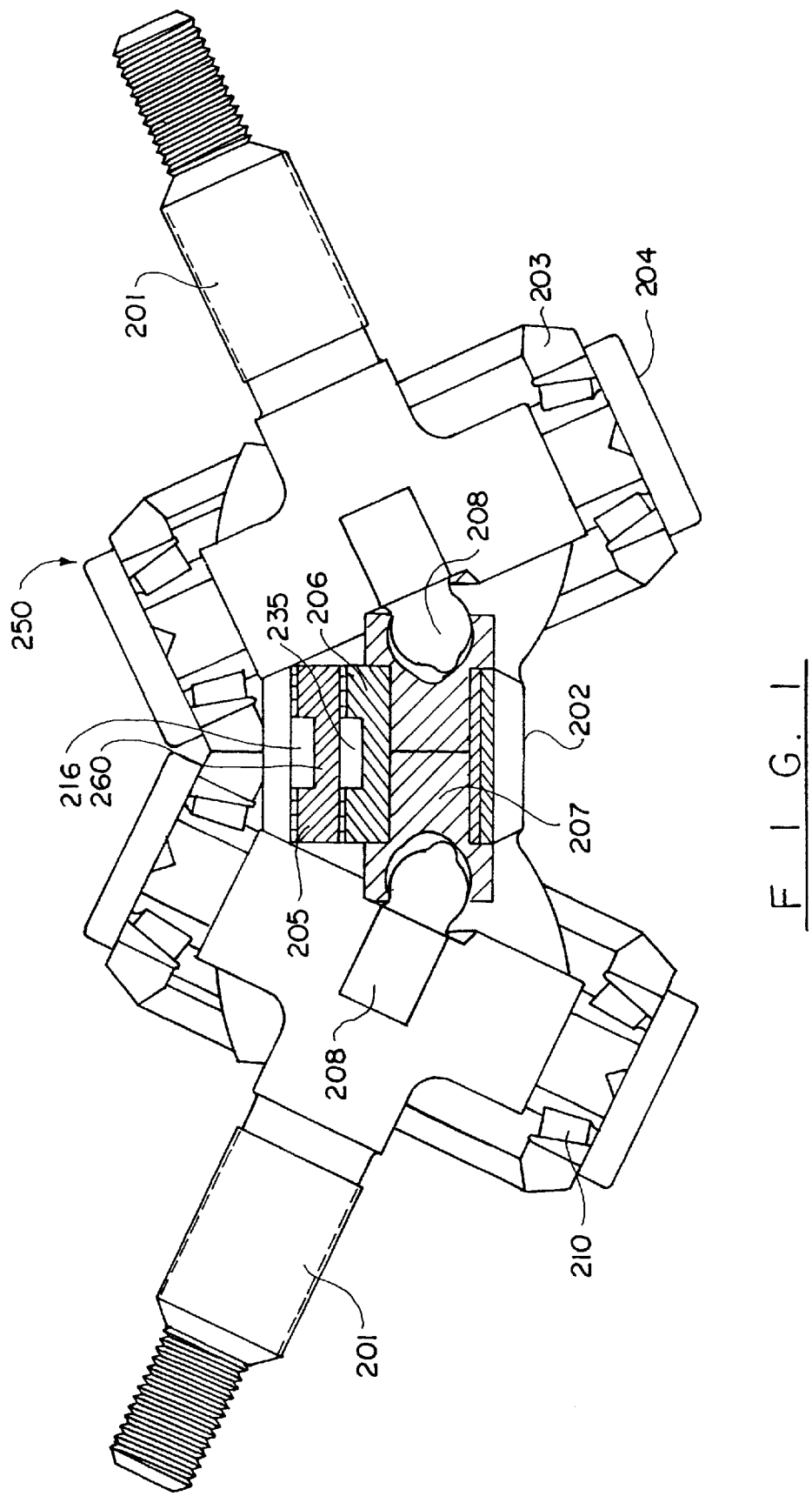
FIG. 1 is a side, cross-sectional view of a universal joint including a centering device of a first embodiment of the present invention.

The following is a list of suitable parts and preferable materials for the various elements of the present invention. The parts could be made of other materials.

101 shafts of universal joint 150 (300M VAR—heat treat 51–53 HRC)
102 long pins of universal joint 150 (300M VAR—heat treat 51–53 HRC)
103 ring of universal joint 150 (AISI 6150, heat treated 36–40 HRC)
104 band of universal joint 150 (300M VAR—heat treat 51–53 HRC)
105 inner race of bearings 170
106 bearing cage of bearings 170
107 spherical roller of bearings 170
108 inner seal of bearing 170 (66 Nylon)
109 outer seal of bearing 170 (66 Nylon)
110 seal groove of bearing race 105
111 seal groove of ring 103
112 spherical surface of long pin 102
114 socket of spherical bearing 165
115 bore in shaft 101 to receive the socket 114 of spherical bearing 165 by press fit
116 inner epicyclic bearing (AerMet 100 (carpenter steel), heat treat 51–53 HRC)
117 coupling member (central shaft) of universal joint 150 (300M VAR, heat treat 51–53 HRC)
118 outer needle rollers between outer epicyclic bearing 119 and coupling member 117 (INA part no. HK 5520)
119 outer epicyclic bearing (52100 alloy steel)
120 shoulder of outer epicyclic bearing 119
121 inner bearing race of outer epicyclic bearing 119
122 through bore in shaft 101 for long pin 102
123 inner needle rollers (Torrington needle rollers, part no. QBR 66162)
124 bearing seal for outer needle bearings 118 (INA part no. G 55 X 63 X 5)
125 hole in ball 135 of spherical bearing 165
126 bore in race 105 of bearing 170
127 spherical bearing race in ring 103 (induction hardened to 60–65 HRC with a case depth of 0.03–0.05 inches)
128 bore in coupling member 117
129 bore in coupling member 117
130 bore in coupling member 117
131 bore in coupling member 117
132 short pins
133 central bore in coupling member 117
135 ball of spherical bearing 165
136 seal surface of spherical bearing race 105
137 central cylindrical section of bearing 116
138 stud of bearing 116
139 cylindrical member of outer epicyclic bearing 119
140 cylindrical through bore of outer epicyclic bearing 119
150 universal joint of the preferred embodiment of the present invention
160 centering device of the preferred embodiment of the present invention
165 spherical bearing (Aurora Bearing part no. PWB-12T)
170 spherical roller bearings (McGill part no. SB22204-W33-SS)
201 shafts of universal joint 250 (300M VAR—heat treat 51–53 HRC)
202 coupling member (central shaft) of universal joint 150 (300M VAR, heat treat 51–53 HRC)
203 ring of universal joint 250 (AISI 4340, heat treated 30–32 HRC)
204 band of universal joint 250 (AISI 4340, heat treated 30–32 HRC)
205 first sleeve of centering device 260 (300M VAR, heat treat 51–53 HRC)
206 second sleeve of centering device 260 (300M VAR, heat treat 51–53 HRC)
207 ball socket of centering device 260 (300M VAR, heat treat 51–53 HRC)
208 ball stud of centering device 260 (300M VAR, heat treat 51–53 HRC)
209 pins (300M VAR, heat treat 51–53 HRC)
210 roller bearings (Timkin part numbers 12580 and 12520)
211 protrusion on a first end of ball stud 208
212 elliptical section of ball socket 207
214 lubricant groove in sleeve 206
215 through bore in sleeve 206
216 lubricant notch in sleeve 205
217 lubricant groove in sleeve 205
218 through bore in sleeve 205
221 outer race of sleeve 205
222 inner race of sleeve 205
223 outer race of sleeve 206
224 inner race of sleeve 206
235 lubricant notch in sleeve 206
250 universal joint of a first embodiment of the present invention
260 centering device

DETAILED DESCRIPTION OF THE PREFERRED EMBODIMENTS

Figure 2:
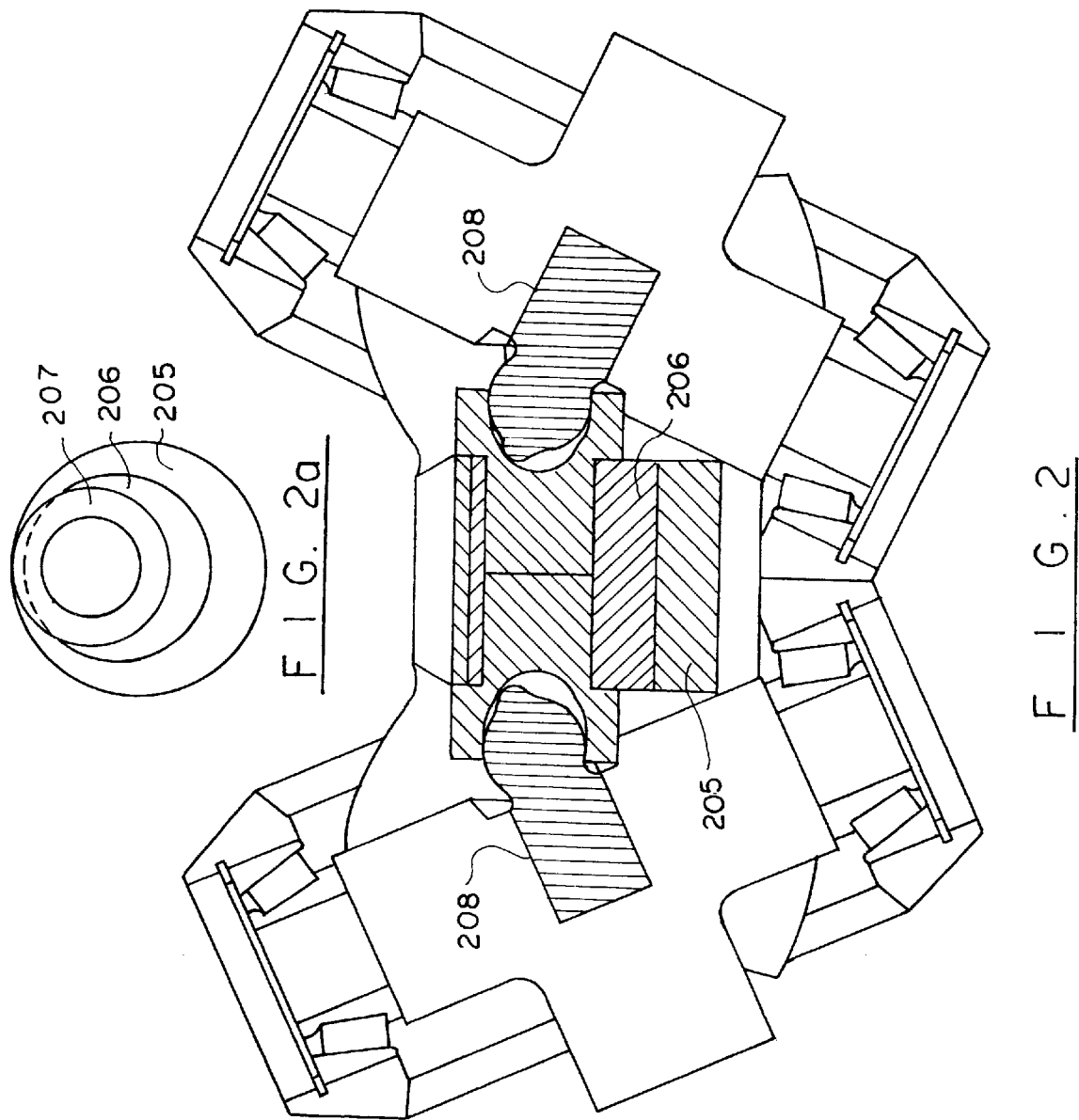
FIG. 2 is a side cross-sectional view of the first embodiment of the present invention, similar to FIG. 1.
Figure 5:
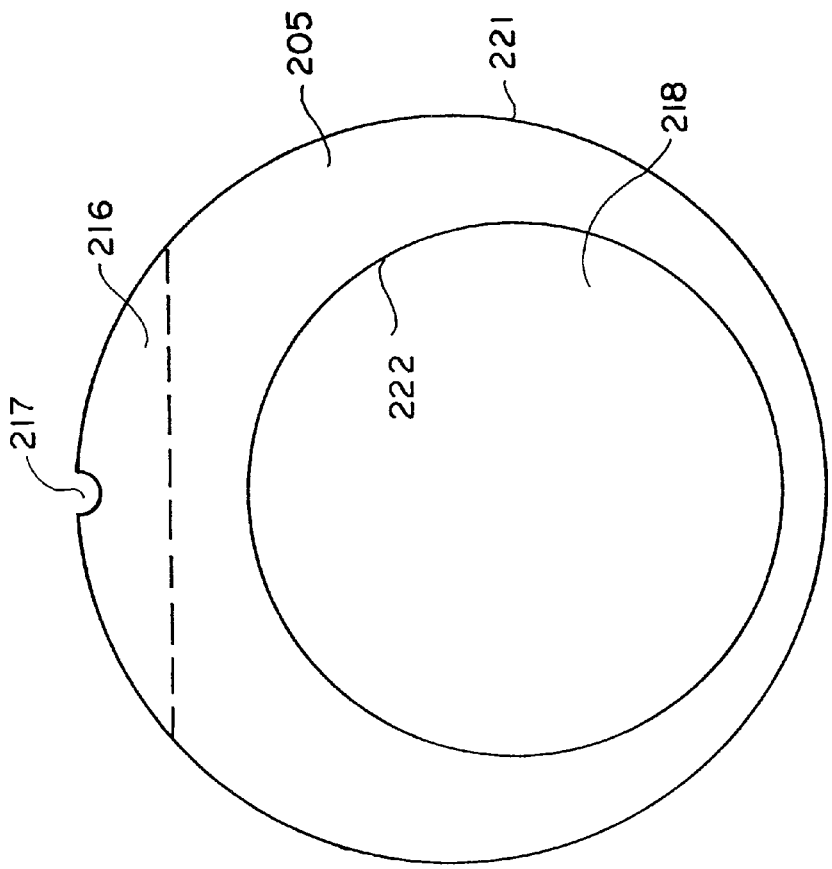
FIG. 5 is a detail showing an end view of the outer sleeve of the centering device of the joint of the first embodiment of the present invention.
Figure 4:
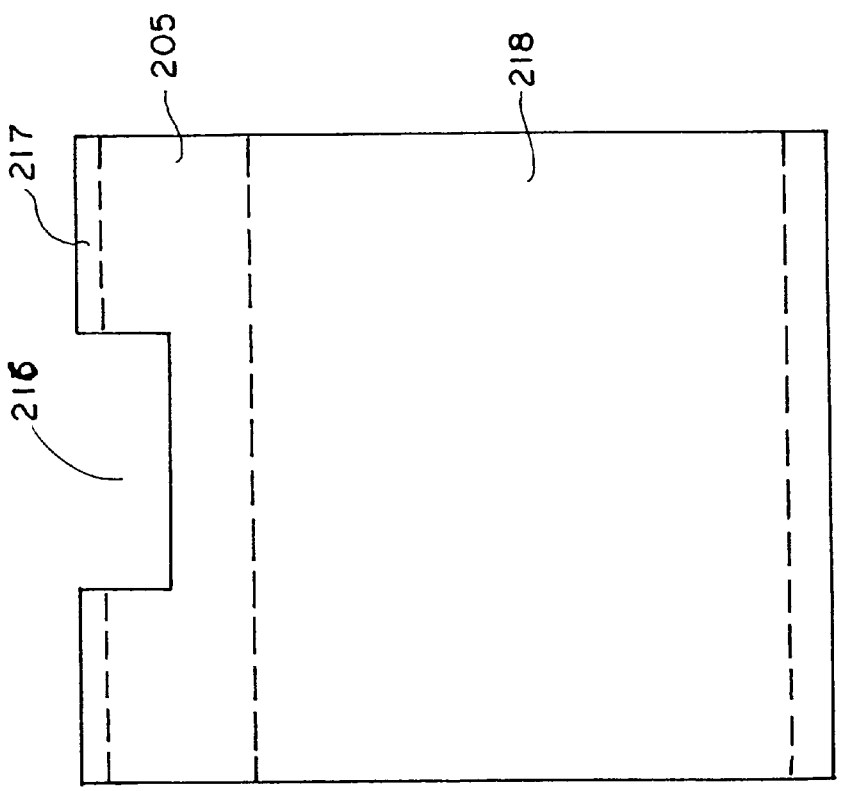
FIG. 4 is a detail showing a side view of the outer sleeve of the centering device of the joint of the first embodiment of the present invention.
Figure 7:
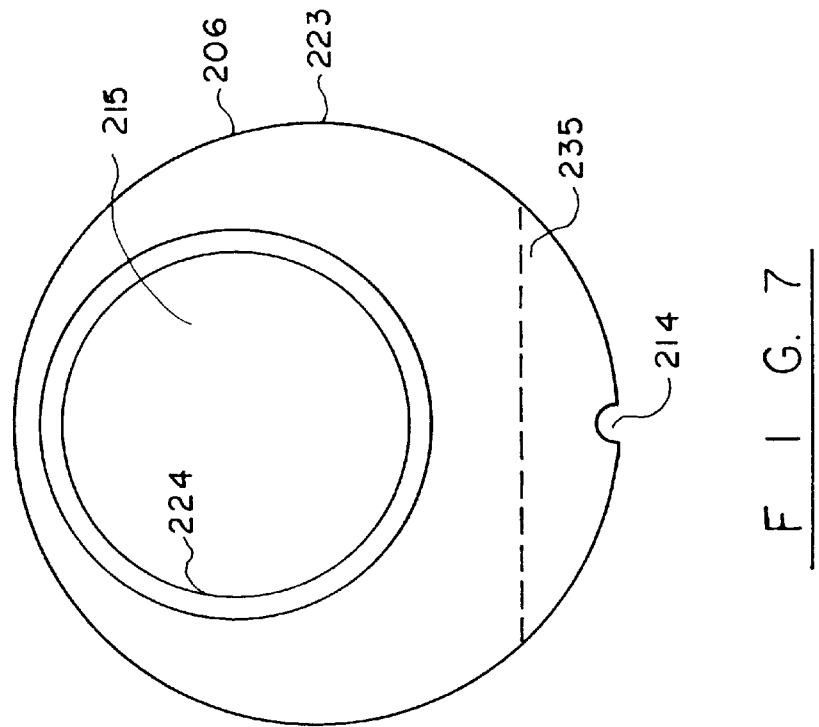
FIG. 7 is a detail showing an end view of the inner sleeve of the centering device of the joint of the first embodiment of the present invention.
Figure 6:
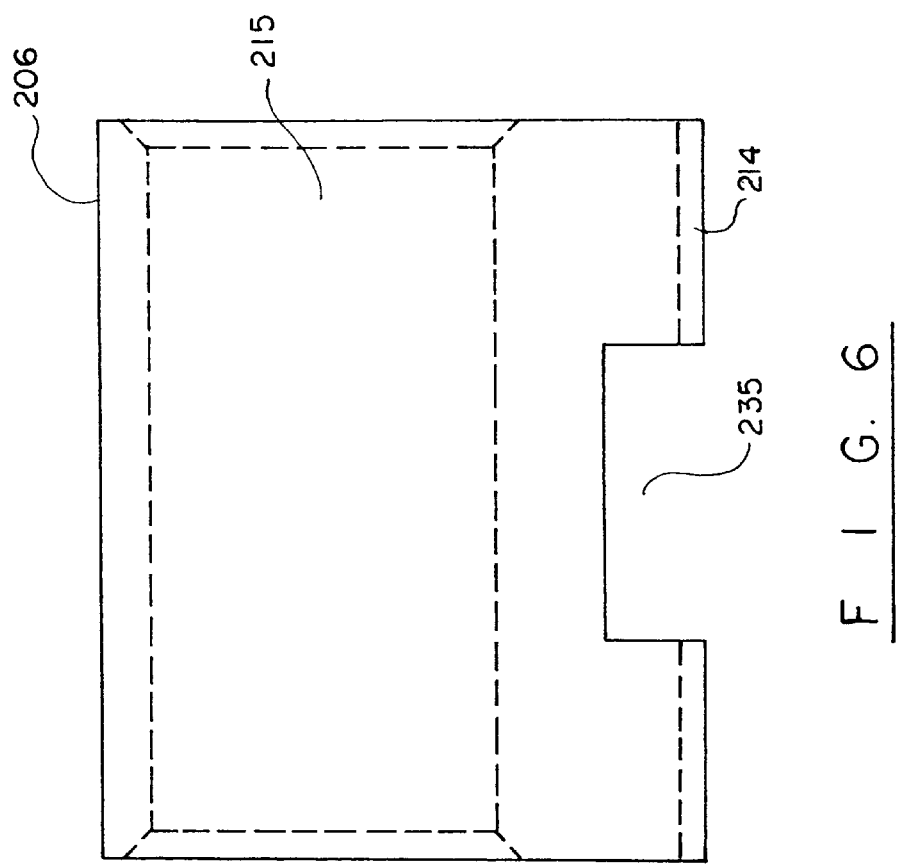
FIG. 6 is a detail showing a side view of the inner sleeve of the centering device of the joint of the first embodiment of the present invention.
Figure 10:
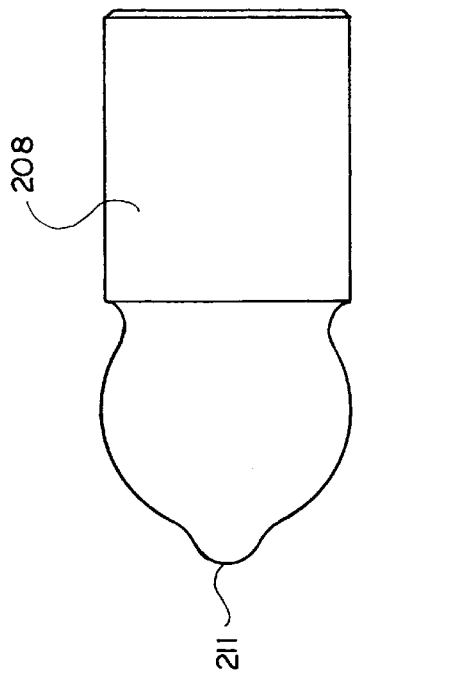
FIG. 10 is a detail showing a side view of a ball stud of the centering device of the joint of the first embodiment of the present invention.
Figure 9:
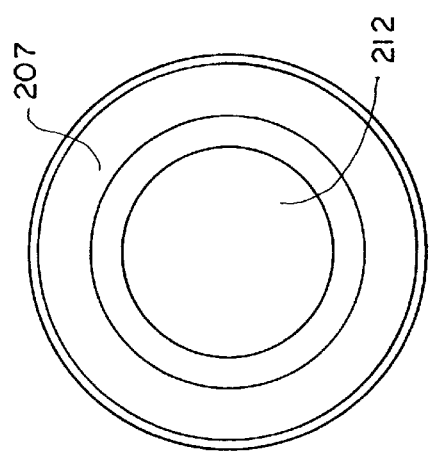
FIG. 9 is a detail showing an end view of a ball socket of the centering device of the joint of the first embodiment of the present invention.
Figure 8:
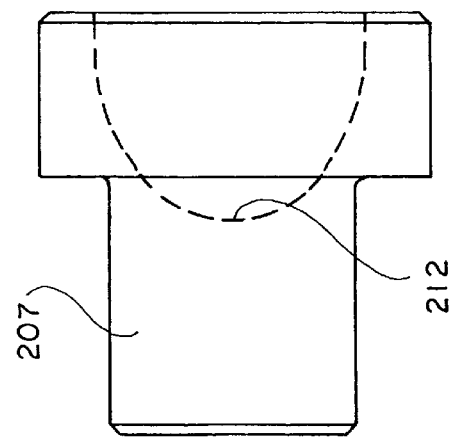
FIG. 8 is a detail showing a side view of a ball socket of the centering device of the joint of the first embodiment of the present invention.

The universal joint 250 of a first embodiment of the present invention is shown in FIGS. 1–10. Universal joint 250 includes a centering device 260 which can be described as an epicyclic hydrodynamic journal bearing (sleeve) 206 within an epicyclic hydrodynamic journal bearing (sleeve) 205. As a Spirograph® brand drawing instrument works, centering device 260 has an outer circle (sleeve 205) with a large hole (cylindrical through bore 218) which is offset from the center of the outer circle. In that large offset hole is placed another circle (sleeve 206) which also has a smaller hole (through bore 215) offset from the center of sleeve 206. If a pencil were placed in the small hole (bore 215) of the inner circle (sleeve 206), lines could be drawn at substantially all locations within the confines of the outer circle (sleeve 205).

The outer race 221 of the outer journal bearing 205 is allowed to rotate within the coupling member 202. The inner race 222 of the outer journal bearing 205 has a through-bore 218 which is parallel to and offset from the longitudinal axis of the outer race 221. The outer race 223 of the inner journal bearing 206 is received within the offset through bore 218 (the inner race 222 of the outer journal bearing 205) of the inner race of the outer journal bearing 205 and allowed to rotate therein. The inner race 224 of the inner journal bearing 206 has a through bore 215 which is parallel to and offset from the longitudinal axis of the outer race 223. A ball stud 208 is press fit into the through bore 215 of the inner race 224 of the inner journal bearing 206. The amount of offset of the through bores 215 and 218 of both journal bearings 206 and 205 is determined by the maximum misalignment requirement of the joint 250.

The centering device 260 includes ball studs 208 which are press fit into shafts 201. When joint 250 is assembled, the ball studs 208 are received in ball sockets 207 which are press-fit into centering device sleeve 206. Centering device sleeve 206 has a running fit within centering device sleeve 205 and centering device sleeve 205 has a running fit within the inner diameter of coupling member 202.

Sleeve 206 has a notch 235 and a groove 214 for the purpose of holding lubricant to provide lubricant to the outer surface of sleeve 206 and the inner surface of sleeve 205. Sleeve 205 has a notch 216 and a groove 217 for the purpose of holding lubricant to provide lubricant to the outer surface of sleeve 205 and the inner surface of coupling member 202.

The geometry of ball studs 208 and ball sockets 207 serves the purpose of keeping the center of the centering device assembly 260 located at the center of coupling member 202. Using this ball and socket geometry is advantageous over using snap rings or other means to locate the centering device 260 because snap ring grooves concentrate stresses which may lead to joint failure.

Ball studs 208 have a protrusion 211 on their ends which fit into the bottom of ball socket 207. Ball studs 208 are circular in cross section. Each ball socket 207, in cross section, can be described as a sleeve with straight sides which blends into a radius which in turn blends into an ellipse. Contact of ball studs 208 and ball sockets 207 occurs between the circular portion of the ball studs 208 and the straight sides of ball sockets 207 and the protrusion 211 of the ball studs 208 and the elliptical section 212 of ball sockets 207.

Centering device 260 is assembled by inserting sleeve 206 into bore 218 of sleeve 205 and then pressing ball sockets 207 into bore 215 of sleeve 206. Sleeve 206 and ball sockets 207 become a permanent assembly which holds sleeve 205 in place with the shoulders of ball sockets 207. The assembly of ball sockets 207 and sleeve 206 can then freely rotate within sleeve 205 and the assembly of sleeve 206 and sleeve 205 can then rotate freely within coupling member 202.

The purpose of centering device 260 is to provide a mechanical means of connecting the input shaft 201 with the output shaft 201 of a double universal joint (joint 250) and forcing each shaft 201 to operate at the same angle with respect to the coupling member 202 of the double joint. This is accomplished by having the centering device 260 provide internal support so that the double joint 250 is self-supporting and self-aligning.

Band 204 of universal joint 250 fits over pins 209 and roller bearings 210 on ring 203 of universal joint 250, as shown in FIG. 3.

Figure 12:
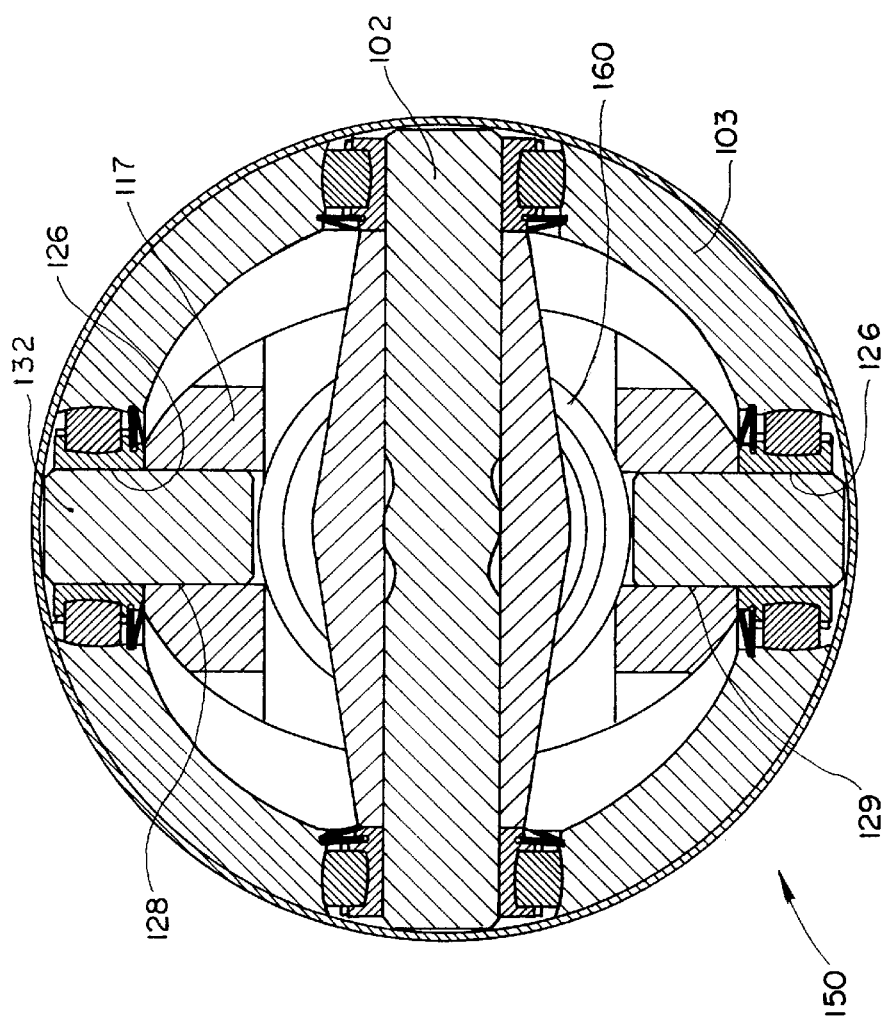
FIG. 12 is a cross-sectional view of the universal joint of the preferred embodiment of the present invention, taken along the lines 12—12 in FIG. 11.
Figure 13:
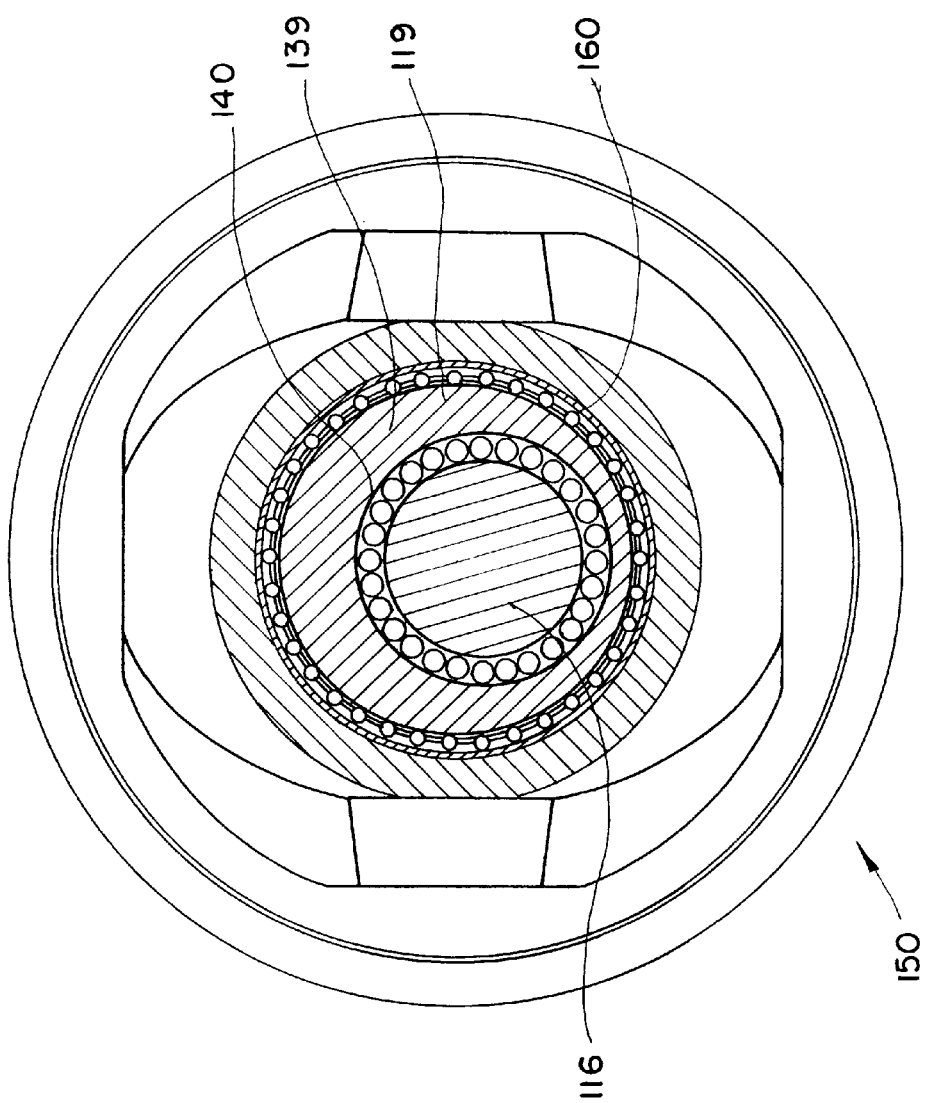
FIG. 13 is a cross-sectional view of the universal joint of the preferred embodiment of the present invention, taken along the lines 13—13 in FIG. 11.
Figure 14:
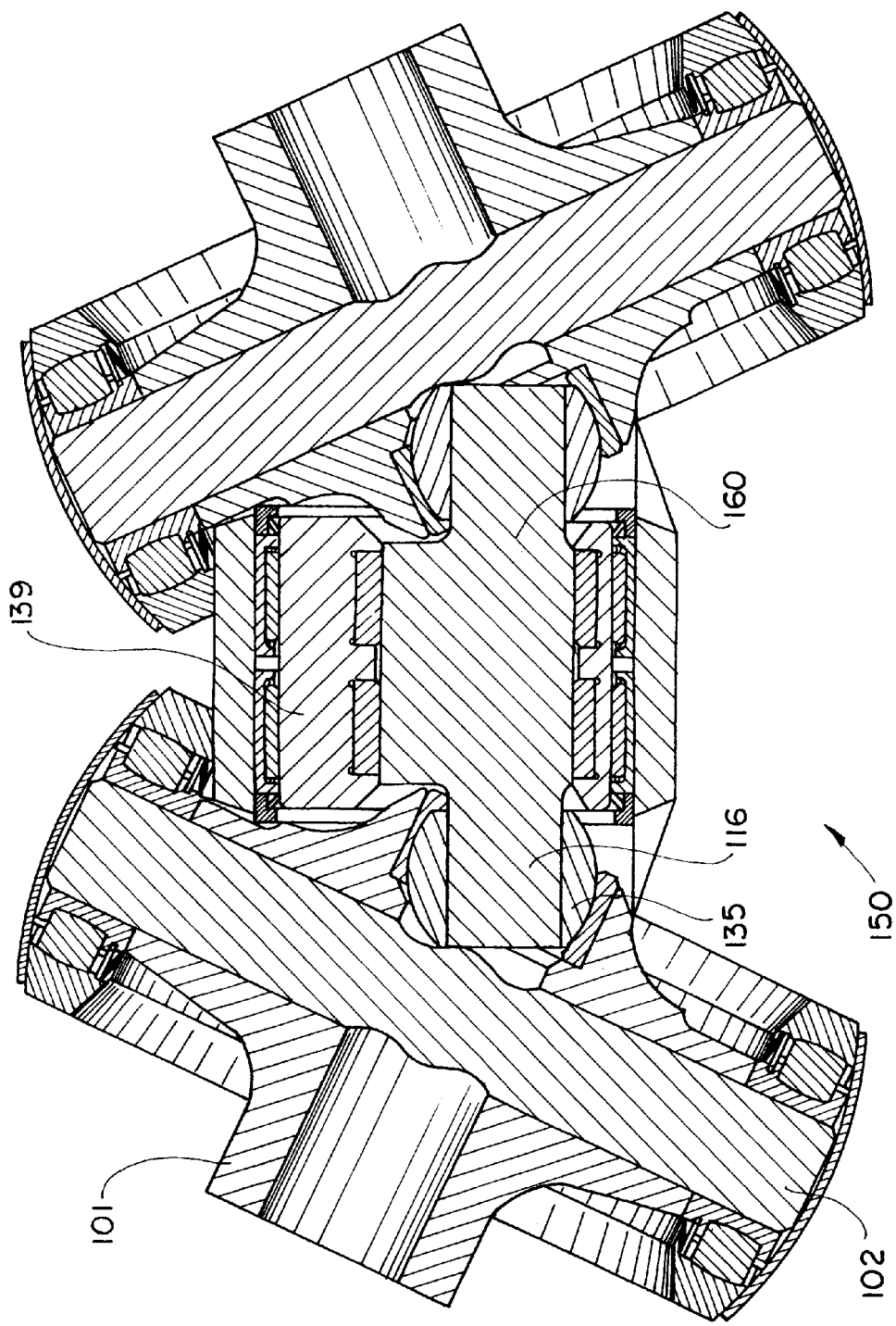
FIG. 14 is a side, cross-sectional view of the universal joint of the preferred embodiment of the present invention, showing the joint at maximum operating angle (in this example, with the shafts misaligned with one another by 50 degrees)
Figure 16:
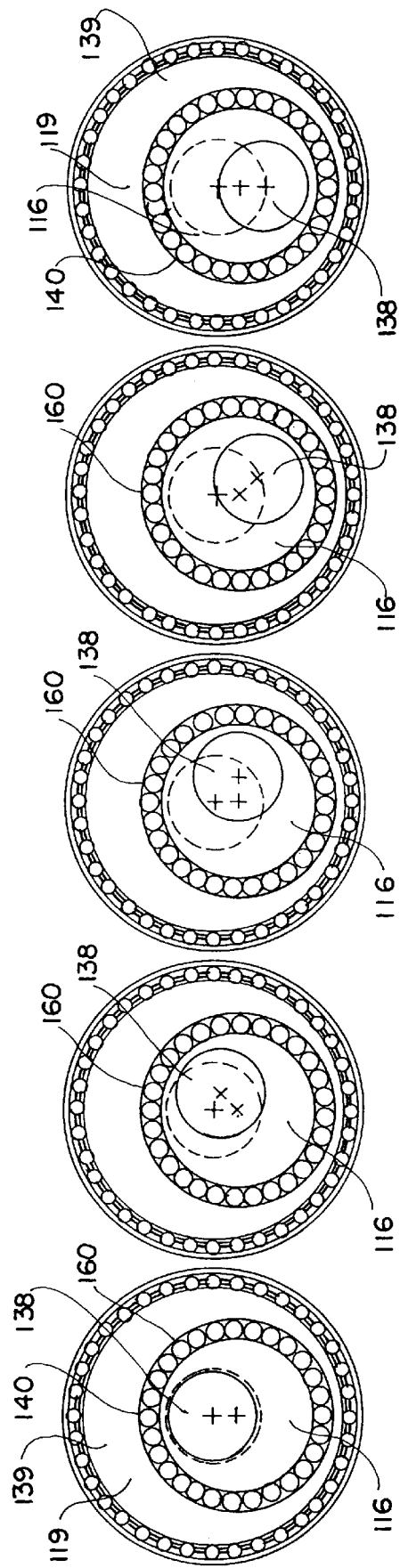
FIGS. 16A–16E are cross-sectional views, similar to FIG. 13, showing the centering device at various operating positions, from 0 degree joint angle in FIG. 16A through maximum joint angle in FIG. 16E.
Figure 17:
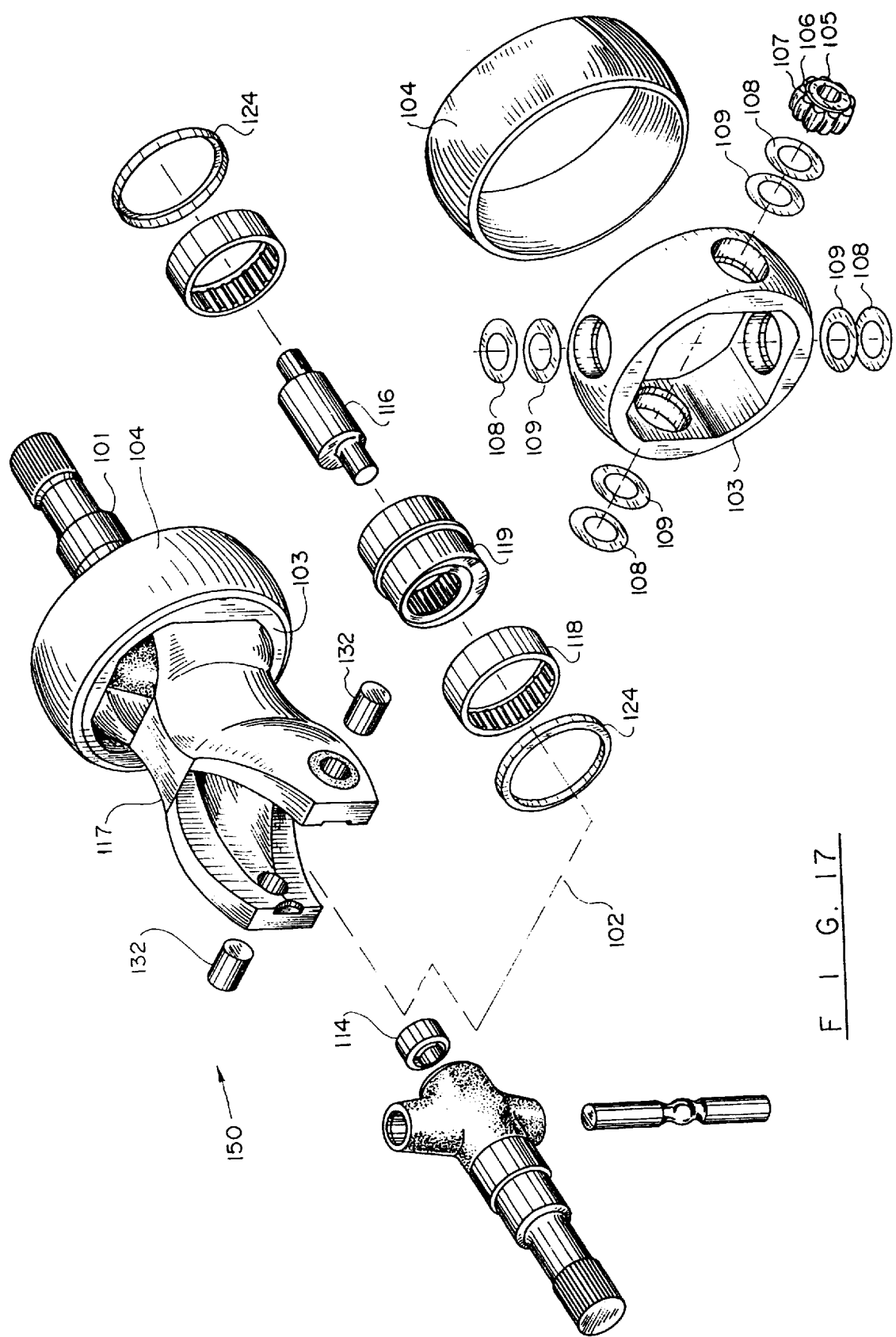
FIG. 17 is an exploded view of the preferred embodiment of the present invention.

The preferred embodiment of the present invention, universal joint 150, can be seen in FIGS. 11–17.

Universal joint 150 includes two rings 103, a coupling member 117, shafts 101, and a centering device 160. Each ring 103 of universal joint 150 has a spherical outer diameter, four flat faces on the inner diameter and integral spherical bearing races within (at four places). Long pins 102 connect shafts 101 to rings 103. Each long pin 102 has at its center a spherical surface 112 for the purpose of retaining the center of inner epicyclic bearing 116 coincident with the bisecting angle plane of the joint located along the line 13—13 in FIG. 11.

The purpose of centering device 160 is to provide a mechanical means of connecting the input shaft 101 with the output shaft 101 of a double universal joint (joint 150) and forcing each shaft 101 to operate at the same angle with respect to the coupling member 117 of the double joint. This is accomplished by having the centering device 160 provide internal support so that the double joint 150 is self-supporting and self-aligning.

The centering device 160 of the preferred embodiment of the present invention can be described as an epicyclic bearing 116 within an epicyclic bearing 119. Similar in function to an epicyclic train wheel, centering device 160 of joint 150 consists of a cylinder (epicyclic bearing 119) whose central axis is and always remains coincident with the central axis of shaft 117. Outer epicyclic bearing 119 is a cylindrical member 139 having a cylindrical through bore 140 whose central axis is parallel to and offset from the central axis of the cylindrical member 139. By placing this cylinder 119 within the through bore 133 of the coupling member 117 and allowing it to rotate therein, the central axis of the offset through bore 140 will follow a circular path within the circumference of the outer diameter of the cylinder 119. The location of the circular path will depend on the amount of offset distance of the central axis of the cylindrical through bore 140. On its own, this has the same motion characteristics as an epicyclic train wheel.

By placing a second epicyclic bearing 116 within bearings 123 in the offset through bore 140 of the first epicyclic bearing 119 a second freedom of movement is accomplished as both are allowed to rotate one within the other. The second epicyclic bearing 116 consists of a central cylindrical section 137 with a stud 138 protruding from each end. Both protruding studs 138 have their longitudinal axes parallel to and offset from the longitudinal axis of the central cylindrical section 137.

Allowing two freedoms of movement of both the first and second epicyclic bearings, the longitudinal axis of the protruding studs can assume any position from being coincident with the central axis of the outer diameter of the outer epicyclic bearing 119 to a limit defined by the circumference of a large circle which is centered within the outer diameter of the outer epicyclic bearing 119.

Universal joint 150 is assembled by pressing outer needle roller bearing 118 into central through bore 133 of coupling member 117. The outer epicyclic bearing 119 is inserted so that shoulder 120 is adjacent the end of bearing 118. Bearing 118 is pressed into the opposite end of the central through bore 133 of coupling member 117 so that the bearing end is adjacent to but not touching shoulder 120 of epicyclic bearing 119. A full complement (thirty-six, for example) of needle rollers 123 are placed into races 121 of epicyclic bearing 119. Epicyclic bearing 116 is then placed within rollers 123.

Band 104 is compressed on two sides at the center of its outer diameter to the point that its oval shape will allow the insertion of ring 103 within. After ring 103 is in place, band 104 is released and band 104 resumes its original spherical shape. Band 104 is free to rotate into any position on ring 103 because they now fit together like a ball and socket.

Inner bearing race 105 is placed within bearing cage 106 and both are placed within spherical bearing race 127 of ring 103. Spherical bearing rollers 107 are inserted into all cage 106 windows by rotating inner race 105 and cage 106 to a point where spherical bearing rollers 107 can be inserted. When all spherical bearing rollers 107 have been inserted, then bearing cage 106 and spherical bearing rollers 107 can be rotated into the position shown in FIG. 11.

After spherical bearing race 105, bearing cage 106, and spherical bearing rollers 107 have been installed, seals 108 and 109 are installed by placing the outer diameter of seal 108 into seal groove 111 of ring 103 and placing the inner diameter of seal 108 into seal groove 110 of bearing race 105. Then, the outer diameter of seal 109 is placed in groove 111 of ring 103 with the inner diameter of seal 109 riding on the seal surface 136 of spherical bearing race 105.

First ring 103 with spherical bearing rollers 107, races 105, seals 108 and 109, and band 104 is placed over coupling member 117 so that holes 126 in races 105 are lined up with holes 128 and 129 of coupling member 117. Band 104 is rotated about the outer spherical diameter of ring 103 to expose hole 126 of race 105. Pin 132 is pressed through hole 126 of race 105 and then pressed into hole 128 of coupling member 117. Another pin 132 is pressed through hole 126 of race 105 and then pressed into hole 129 of coupling member 117. Band 104 is then rotated about the outer spherical diameter of ring 103 to cover holes 126 of races 105.

Second ring 103 with spherical bearing rollers 107, races 105, seals 108 and 109, and band 104 is placed over coupling member 117 so that holes 126 in races 105 are lined up with holes 130 and 131 of coupling member 117 (see FIG. 15). Band 104 is rotated about the outer spherical diameter of ring 103 to expose hole 126 of race 105. A pin 132 is pressed through hole 126 of race 105 and then pressed into hole 130 of coupling member 117. Another pin 132 is pressed through hole 126 of race 105 and then pressed into hole 131 of coupling member 117. Band 104 is then rotated about the outer spherical diameter of ring 103 to cover holes 126 of races 105.

Next, the spherical bearing 165 with ball 135 and socket 114 are pressed into holes 115 of shafts 101. Shafts 101 are then inserted between bearing races 105 and protruding studs 138 are inserted into holes 125 of balls 135. Band 104 is then rotated about the outer spherical diameter of ring 103 to expose holes 126 of race 105. Long pin 102 is pressed through hole 126 of race 105 and then pressed into bore 122 of shaft 101 and into the hole 126 of the race 105 at the opposite side of ring 103. Band 104 is then rotated about the outer spherical diameter of ring 103 to cover hole 126 of race 105.

The hemispherical split cups of coupling member 117 have been chamfered perpendicular to the notches thereof to reduce weight. Likewise, the hemispherical split cups of coupling member 202 have been chamfered perpendicular to the notches thereof to reduce weight. Coupling member 202 can be the same as coupling member 117.

The shoulder 120 of outer epicyclic bearing 119 is used to locate outer epicyclic bearing 119 while allowing outer epicyclic bearing 119 to rotate in the center of joint 150.

The inner bearing races 121 of outer epicyclic bearing 119 are used to hold a full complement of needle rollers 123. The inner needle rollers provide a full complement of rolling elements between inner epicyclic bearing 116 and outer epicyclic bearing 119.

Bearings 170 are spherical bearings and fit in spherical sockets in rings 103; the geometry of the bearings 170 causes these bearings to be mechanically retained in rings 103, so band 104 need only act as a sealing means for these bearings, not as a mechanical retaining means.

The universal joint of the present invention could also be made as a single joint with the novel spherical bearing means in the ring and/or the novel spherical outer shape of the ring, without a centering device, The foregoing embodiments are presented by way of example only; the scope of the present invention is to be limited only by the following claims.

What is claimed is:

1. A universal joint comprising:
   (a) first and second rings;
   (b) first and second yokes disposed within the first and second rings, respectively;
   (c) first and second shafts;
   (d) first pin means pivotally interconnecting the first yoke and the first ring;
   (e) second pin means pivotally interconnecting the first shaft and the first ring;
   (f) third pin means pivotally interconnecting the second yoke and the second ring;
   (g) fourth pin means interconnecting the second shaft and the second ring;
   (h) a coupling means interconnecting the first yoke and the second yoke; and
   (i) a plurality of spherical bearing means received in spherical races in each ring, the bearing means in the first ring receiving the first and second pin means, and the bearing means in the second ring receiving the third and fourth pin means, wherein the spherical bearing means are shaped such that their geometry retains them in the rings.

2. A universal joint comprising:
   (a) first and second rings, each ring having a spherical outer surface;
   (b) first and second yokes disposed within the first and second rings, respectively;
   (c) first and second shafts;
   (d) first pin means pivotally interconnecting the first yoke and the first ring;
   (e) second pin means pivotally interconnecting the first shaft and the first ring;
   (f) third pin means pivotally interconnecting the second yoke and the second ring;
   (g) fourth pin means interconnecting the second shaft and the second ring;
   (h) a coupling means interconnecting the first yoke and the second yoke;
   (i) a plurality of bearing means in each ring, the bearing means in the first ring receiving the first and second pin means, and the bearing means in the second ring receiving the third and fourth pin means; and
   (j) first and second bands, each band having a spherical inner surface for fitting over the spherical outer surface of the rings.

* * * * *